Figure 2:
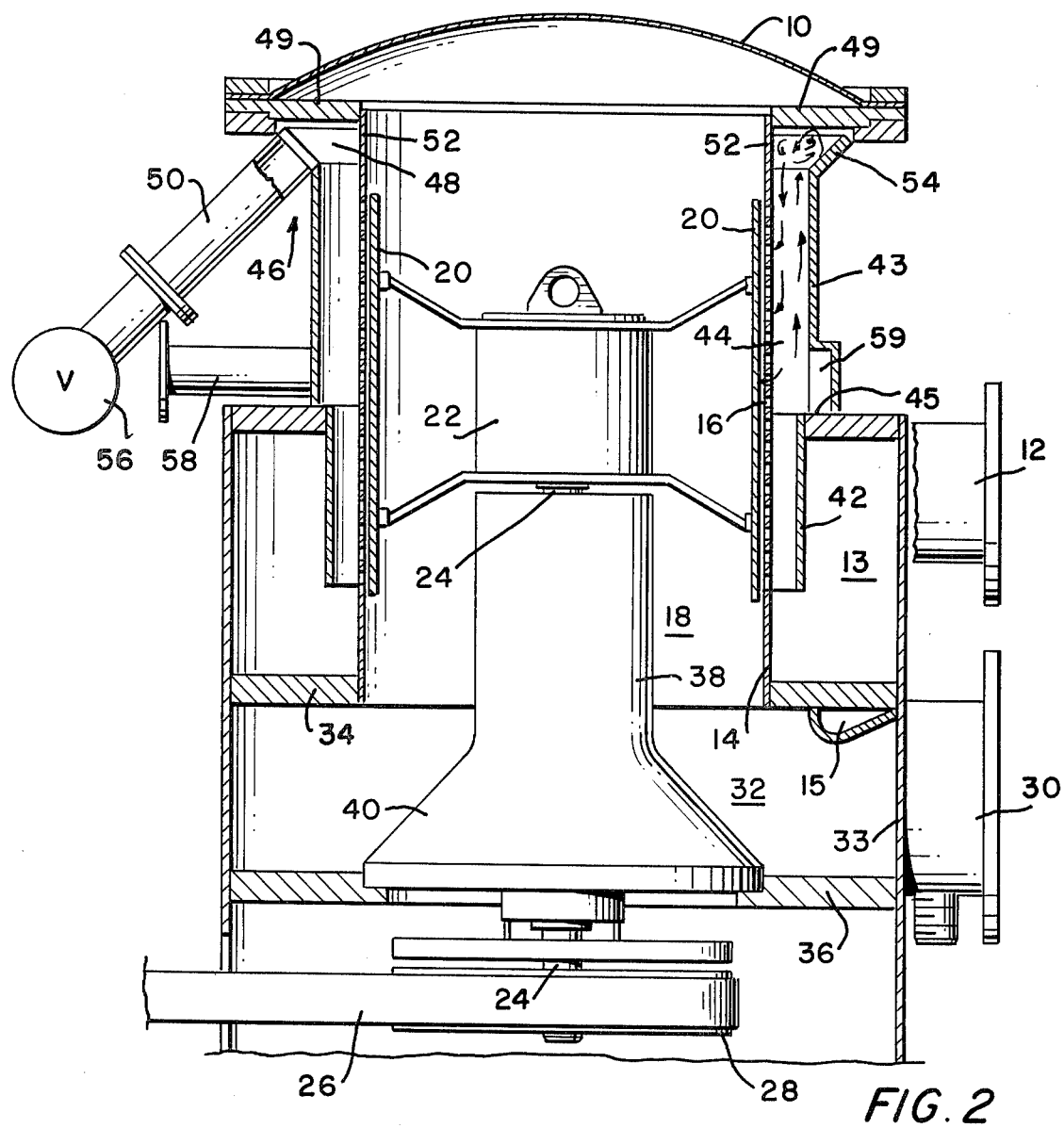

United States Patent [19]

Young

[11] 4,222,863
[45] Sep. 16, 1980

[54] SCREENING APPARATUS AND METHOD

[75] Inventor: Douglas L. G. Young, Beaconsfield, Canada

[73] Assignee: Ingersoll-Rand Canada Inc., Montreal, Canada

[21] Appl. No.: 5,368

[22] Filed: Jan. 22, 1979

[51] Int. Cl.² .............................................. B07B 1/20
[52] U.S. Cl. .................................... 209/273; 209/17; 209/18; 209/306; 210/414
[58] Field of Search ............................. 209/13, 17–18, 209/44, 255, 258, 268, 270, 273, 303–306; 210/414, 415

[56] References Cited
U.S. PATENT DOCUMENTS

| 3,255,883 | 6/1966 | Nelson et al. | 209/273 |
| 4,067,800 | 1/1978 | Young | 209/273 |

Primary Examiner—Richard L. Chiesa
Attorney, Agent, or Firm—Frank S. Troidl

[57] ABSTRACT

A pressurized screening apparatus removes both buoyant contaminants and denser contaminants from a liquid suspension containing desirable fibers and contaminants. Both the undesirable buoyant contaminants and the undesirable denser contaminants are accumulated in the same section of the pressurized screening apparatus. If desired, the accumulating buoyant contaminants and denser contaminants may be intermittently removed from the pressurized screening apparatus.

5 Claims, 2 Drawing Figures

SCREENING APPARATUS AND METHOD

This invention relates to pressure-operated apparatus for screening fibrous material suspended in liquid such as wood pulp suspensions and the like.

In pulp and paper making system, screening apparatus are placed at various locations in these systems to remove undesirable contaminants from the wood pulp suspension. The size and type of contaminants which must be removed at a particular location depends on what happens in the system upstream and downstream of the screening apparatus.

In one type of pulp processing system, the partially cooked chips and knots contained in the pulp discharged from the digester cannot be allowed to proceed further in the system. The partially cooked chips and knots, as well as, many other comtaminants are effectively removed by, for example, the pressurized screening apparatus disclosed in U.S. Pat. No. 4,067,800 granted Jan. 10, 1978, to Douglas L. Young, entitled "SCREENING APPARATUS."

In that case, the screen was required to separate bouyant contaminants, and was characterized by a continuous reject flow capable of conveying a significant proportion of the solids from the feed suspension.

However, other types of pulp processing systems require the removal of various types of contaminants which may be present in a wide range of concentrations, of which some present strick limitations both on the permissible maximum amount of good fiber that may be rejected with the contaminants on the permissible use of dilution or elutriation in the screen.

For instance, most paper and board manufacturing mills include in their product at least some proportion of fiber which has been previously formed into a sheet and which must be repulped into a fluid suspension during their operation. Such previously formed sheets may be unsold material from their own manufacture, or virgin pulp sheets suppled from a separate mill, or recycled waste paper from various sources. Contaminants may enter the system with this material, and may include bouyant materials such as particles of wood, foamed plastic and plastic film and dense materials such as gravel, grit and baling wire pieces. In addition, occasional pieces of larger tramp material, such as metal and concrete fragments and small rocks, may originate in the same way or from a deterioration of facilities and equipment in the upstream process. In some cases, slivers, chunks and other oversized woody particles originating in the pulp making process may be classified as contaminants. Removal of such contaminants, economically and without significant loss of good fiber, may be required at various locations in the pulp and paper making process in order to achieve the required product quality and/or in order to enhance the efficiency of downstream operations.

Present methods of separating such comtaminants include multiple operations of cascade screening systems or vortex separation, which systems have capital and operating costs. Furthermore, such methods tend to cause undesirably high losses of good fiber from the system.

My invention comprises a presurized screening apparatus and method for segregative and accumulating both bouyant and dense contaminants, and provides the capability of intermittent discharge of rejects resulting in the minimum loss of good fiber. A high degree of operative flexibility is provided to meet various process needs. For instance, an important problem in many paper mills is the loss of production arising from the plugging of hydrocyclone nozzles by contaminants in the furnish and resulting downtime for their cleaning. Heretofore the removal of such contaminants involved unacceptably complicated and expensive equipment systems. With the present invention these contaminants are removed with a simple extra piece of process equipment, without dilution of the regulated stock consistency and without significant loss of fiber. Alternatively, for a waster paper system involving a heavy contaminant load, the screen can be operated with an elutriation flow of liquor into the screening compartment and a continuous flow of rejects, thus again removing the varied contaminants with the least practical fiber content of the reject flow. Thus the simultaneous removal of both bouyant and dence contaminants can be achieved with or without elutriation and with either intermittent or continuous reject flow.

Briefly described, this invention is a pressurized screening apparatus for screening a liquid suspension containing desirable fiber and undersirable bouyant contaminants and denser contaminants. A fixed enclosing screen having an axial apertured section forms an accepts chamber. An accepts outlet communicates with the accepts chamber. A fixed wall surrounds the screen to form an axially extending annular channel. The liquid suspension is flowed upwardly within the channel. A contaminant accumulating section above the channel is constructed to entrap bouyant contaminants and denser contaminants.

My new method of accumulating and removing both bouyant contaminants and denser contaminants from a single section of a pressurized screening apparatus comprises feeding the suspension to the pressurized screening apparatus and flowing the suspension along a channel in the apparatus formed by an apertured fixed screen and a fixed wall so that acceptable fiber will flow through the apertures in the screen and out of the housing. The bouyant contaminants and the denser contaminants are accumulated in a single section in the housing above the channel and intermittently removed.

Figure 1:
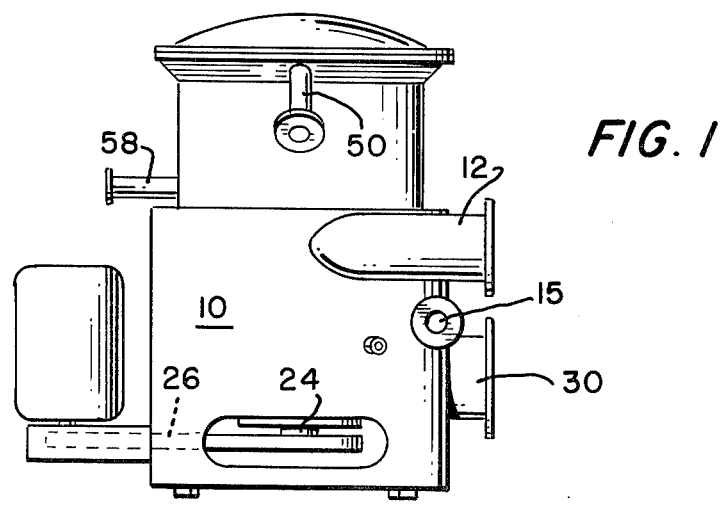

The invention as well as its many advantages may be further understood by reference to the following detailed description and drawings in which:

FIG. 1 is a elevational view illustrating a preferred embodiment of the invention; and FIG. 2 is an elevational view, partly in section, on an enlarged scale, of the preferred embodiment of FIG. 1.

Like parts are referred to by like numbers in the various figures.

Referring to the drawings, the new screening apparatus includes a housing 10 which is provided with a tangential feed wood pulp suspension inlet 12 for feeding pulp suspension into chamber 13. A tangential junk trap 15 removes any relatively very heavy, large foreign material. A fixed enclosing screen 14 having an axial apertured section 16 extending around its periphery, forms an inner accepts chamber 18. Rotatable foil means including a pair of hydrofoils 20 circumferentially separated by an approximate 180° C. arc is coaxial with the screen. The hydrofoils are mounted upon a rotor 22 which rotates with rotatable shaft 24 which is driven by a motor driven belt 26 extending around a pulley 28 connected to the bottom of the rotatable shaft 24.

The accepts outlet 30 is in fluid communication with the inner chamber 18 through an annular accepts chamber 32 formed by a portion 33 of the vertical wall of housing 10, the annular partition 34, the annular partition 36, and the stationary center column 38. Column 38 extends upwardly in the center of the housing 10 and surrounds the rotatable shaft 24. The bottom portion 40 of the stationary column 38 is tapered to facilitate the flow of the desired constituents into the annular chamber 32 and out of the housing 10 through accepts outlet 30.

A fixed cylindrical wall having a lower portion 42 and an upper portion 43 of larger diameter thus forming an upwardly facing annular shoulder 45, surrounds the enclosing screen 14 to form an axially extending annular channel 44 defined by the outside of the screen 14 and the cylindrical wall.

A contaminant accumulator section, generally indicated by the number 46 includes an annular bouyant-contaminant-suspending zone 48 and a denser-contaminant-accumulator pipe 50. The inner wall 52 of the bouyant-contaminant-suspending zone 48 is preferably the solid upper portion of the fixed enclosing screen 14. The outer wall 54 of the bouyant-contaminant-suspending zone 48 preferably extends angularly outwardly at 45° C. angle from the top of larger diameter portion 43 of the fixed cylindrical wall. A large annular plate 49 forms the top of zone 48. The denser-contaminant-accumulator pipe 50 extends perpendicular from the outer wall 54.

A valve 56 is located at the exit of accumulator pipe 50. This valve is normally closed and many be intermittently opened to permit the removal of both the bouyant contaminants and the denser contaminants from the housing.

One or more liquor inlets may be provided. In the particular embodiment shown there is included a liquor inlet pipe 58 leading to a tangential liquor outlet 59 which is located on the larger diameter portion 43 just above annular shoulder 45. The tangential introduction of the liquor plus the provision of the annular shoulder 45 causes a stronger axial flow along the radially outer portion of channel 44 thus enhancing the conveyance of dense particles upwardly into zone 48.

In operation, the suspension fed through pulp suspension inlet 12 into the annular chamber 13 will be fed into the bottom of annular channel 44 and then flow upwardly within channel 44. The spacing between the screen 14 and the cylindrical wall is such that the majority of the desirable fibers flow through the apertures in the cylindrical section 14, into the inner chamber 18, downwardly into the annular accepts chamber 32, and out of the accepts outlet 30.

The hydrofoils 20 rotate within the inner chamber 18 with a small radial clearance between the outside of the blades and the inside of the screen 14. The rotation of the hydrofoils 20 within the inner chamber 18 along a path close to the inside of the screen 16 develops hydrodynamic flow pulses directed radially outwardly and operable to dislodge accumulated unwanted material from the outside of the screen 16.

The contaminants may include some bouyant and some denser particles as previously noted. Each type of particle is segregated due to non acceptance by screen apertures or by the centrifugal force field, and is then conveyed by the flow field to a location where accumulation occurs and from which these rejects are discharged from the screen. Tangential introduction of the feed creates a flow regime in the screening zone 44 and accumulator section 46 which overall has approximately a free vortex form. This generates the centifugal force field which contributes to the segregation operation. Further effects are to create an axial velocity profile across the screening zone annulus 44 such that the maximum upward velocity occures adjacent to walls 42 and 43, and to create an inward radial flow component on the underside of the end plate 49 of the accumulator section 46. The combined action of these two flow streams is first to convey the dense particles upward to the location from which settling by gravity into the dense rejects accumulator 50 occurs, and second to create a compound vortex field in the bouyant rejects accumulator zone 48. This compound vortex field has a toroidal form, in which the toroid rotates about the screen axis as part of the overall vortex flow field, and in which a secondary vortex within the toroidal field rotates about the circular axis of the toroid, thereby creating an annular low pressure zone at the center of the toroidal field. Bouyant particules tend to become concentrated in this low pressure zone pending joint discharge with the heavy rejects when valve 56 is opened. These flow streams components in the plane of the drawing are shown by arrows on FIG. 1.

Continuous removal of contaminants is not necessary with this apparatus. The contaminants may be removed intermittently. Thus, less fluid is discharged than would be required if a continuous operation were necessary. Also, the consistency of the material from the accepts outlet 30 is substantially unchanged from the consistency of the established feed to suspension inlet 12. This is highly important with screens used on regulated furnish is a paper machine supply system. Also, because removal of the contaminants is intermittent rather than continuous, any desirable fibers which flow entirely through the channel 44 and into the bouyant contaminant zone 48 will tend to flow back down into the channel 44 along the apertures 16 and into the accepts chamber 18. Thus, the percent of desirable fiber which is removed from the housing along with the contaminants is greatly decreased when compared with the percent of desirable fibers which would be removed along with the contaminants in a continuous rejects flow system.

The liquor inlet 58 could be used if desired. For example, liquor may be flowed into the housing by means of pipe 58 when it is desired to flush or clean out the channel 44 and the contaminant accumulator section 46. The tangential flow into channel 44 from liquor inlet 59 and the higher pressure profile adjacent the wall 43 created by such tangential flow in conjunction with annular shoulder 45 assures that any contaminants tending to remain in channel 44 are flushed upwardly into contaminant accumulator section 46.

I claim:

1. A method of accumulating and removing both bouyant contaminants and denser contaminants from a single section of a pressurized screening apparatus comprising: feeding a suspension containing desirable fibers, undesirable bouyant contaminants, and denser contaminants into the pressurized screening apparatus; flowing said suspension into the bottom of and upwardly within a channel formed by a fixed screen and a fixed wall in the screening apparatus so that acceptable fiber will flow through the apertures in the screen and out of the housing; accumulating the bouyant contaminants and the denser contaminants in section in the housing above the channel; and removing both the bouyant contaminants and the denser contaminants from said section in the housing.

2. A pressurized screening apparatus for screening a liquid suspension containing desirable fiber, undesirable bouyant contaminants, and denser contaminants comprising: a housing; means for tangentially feeding the liquid suspension into the housing; a fixed enclosing screen in the housing having an axial apertured section extending around its periphery and forming an accepts chamber; an accepts outlet communicating with the accepts chamber; a fixed wall surrounding the enclosed screen to form an axially extending unobstructed annular channel defined by the outside of the screen and said wall; means for feeding the liquid suspension into the bottom of said annlar so that the liquid suspension flows upwardly within the axially extending annular channel; a contaminant accumulator section above said channel, said contaminant accumulating section being constructed to entrap bouyant contaminants and denser contaminants, and including an annular bouyant contaminant suspending zone directly above the axially extending unobstructed annular channel.

3. A pressurized screening apparatus in accordance with claim 1 wherein the annular bouyant contaminant suspending zone is formed by an inner wall, an outer wall and an end plate; and the contaminant accumulating section also includes a denser contaminant accumulator pipe extending from said outer wall.

4. A pressurized screening apparatus in accordance with claim 2 wherein: the inner wall of the bouyant contaminant suspending zone is the solid upper portion of said fixed enclosing screen, the outer wall extends angularly outwardly from the top of said fixed wall surrounding said enclosing screen, and the denser contaminant accumulator pipe extends perpendicularly from the outer wall.

5. A pressurized screening apparatus in accordance with claim 3 wherein: the fixed wall is cylindrical with a lower portion of a predetermined diameter and an upper portion of larger diameter interconnected by an upwardly facing annular shoulder; and a liquor inlet leads tangentially into said upper portion of larger diameter at the upwardly facing annular shoulder.

* * * * *